(12) United States Patent
Braun

(10) Patent No.: US 7,190,831 B2
(45) Date of Patent: Mar. 13, 2007

(54) METHOD FOR SQUEEZING AN INPUT HUE TOWARD A REGION OF PREFERRED HUE

(75) Inventor: Karen M. Braun, Fairport, NY (US)

(73) Assignee: Xerox Corporation, Stamford, CT (US)

(*) Notice: Subject to any disclaimer, the term of this patent is extended or adjusted under 35 U.S.C. 154(b) by 773 days.

(21) Appl. No.: 10/642,795

(22) Filed: Aug. 18, 2003

(65) Prior Publication Data
US 2005/0041857 A1  Feb. 24, 2005

(51) Int. Cl.
G06K 9/00 (2006.01)
H04N 9/64 (2006.01)
G03F 3/08 (2006.01)
G04N 1/46 (2006.01)
H04N 5/00 (2006.01)

(52) U.S. Cl. .................. 382/167; 358/520; 348/649
(58) Field of Classification Search ............... 382/162, 382/167, 168; 348/649, 650, 603, 621, 624, 348/645, 655, 708, 712, 713, 256; 358/518, 358/520, 500, 501, 522, 523
See application file for complete search history.

(56) References Cited

U.S. PATENT DOCUMENTS 5,930,009 A     7/1999  Sato et al.
6,058,207 A     5/2000  Tuijn et al. ............... 382/162
6,438,264 B1    8/2002  Gallagher et al.
6,731,796 B2*   5/2004  Maltz et al. ............... 382/167
6,947,078 B1    9/2005  Kuwata et al.
7,072,072 B1*   7/2006  Balasubramanian et al. . 358/1.9
2002/0191084 A1 12/2002 Kurokawa
2004/0151370 A1 8/2004  Sasaki
2005/0041155 A1 2/2005  Braun
2005/0041853 A1 2/2005  Braun

OTHER PUBLICATIONS

Article by Karin Töpfer and Robert Cookingham of the Eastmak Kodak Company in Rochester, NY, entitled: "The Quantitative Aspects of Color Rendering For Emmory Colors" from the IS&T's 2000 PICS Conference.

* cited by examiner

Primary Examiner—Yon J. Couso

(57) ABSTRACT

A method is disclosed for squeezing an input hue, $H_{in}$, toward a region of preferred hue, $H_{pref}$ having a preferred chroma, $C_{pref}$ and luminance, $L_{pref}$ to restrict the rotation effect to a point in LCH space rather than an entire hue slice. This method involves defining a chroma weight as: $C_{weight}=\text{Gaussian}(C_{pref},C_{sigma})$; defining a luminance weight as: $L_{weight}=\text{Gaussian}(L_{pref},L_{sigma})$; defining a hue weight as: $H_{weight}=\text{Gaussian}(H_{pref},H_{sigma})$; defining an amount of hue adjustment as: $H_{Adjust}=\Delta H^{*}(H_{weight}{*}C_{weight}{*}L_{weight})$; and finally, generating an output hue by applying hue adjustment to hue input such that: $H_{out}=H_{in}-H_{Adjust}$.

19 Claims, No Drawings

METHOD FOR SQUEEZING AN INPUT HUE TOWARD A REGION OF PREFERRED HUE

RELATED APPLICATIONS

Cross reference is made to the following applications filed concurrently herewith: 10/642,795 entitled "A METHOD FOR DETERMINING A HUE ADJUSTMENT TO AN INPUT HUE" by Karen M. Braun; and 10/642,796 entitled "A METHOD FOR DETERMINING AN ADJUSTMENT AMOUNT TO AN INPUT CHROMA" by Karen M. Braun.

FIELD OF THE INVENTION

The present invention generally relates to methods for converting color values and, more particularly, to methods for adjusting input colors in the direction of a specified output color to improve image appearance.

BACKGROUND OF THE INVENTION

Film companies are known to change certain colors to, for instance, show skin more tanned or the sky a different shade of blue. This is relatively easy when one has control over most every aspect of the image capturing and image production process. However, when the input image has been captured and rendered in an unknown way, improving certain colors therein becomes more complicated. This often involves segmenting colors believed to make up a certain color then adjusting these toward a preferred color point. This is computationally intensive, subject to failure, and often results in non-smooth transitions between different color regions such as skin color and non-skin color areas.

Another approach is to specify both original and desired color and then apply a vector from original to desired color with the effect of the vector smoothly decaying for nearby colors in color space. One problem with this approach is non-monotonic behavior leading to color reversals. Other techniques involve a weighting function for transforming a color to a new color and smoothly adjusting surrounding colors without inducing any tone reversals using a Gaussian weight on the difference between the input and the desired output. This method also uses a conditional function to insure monotonicity of the input to output relationship. Another technique transforms an input color to a desired output color and colors surrounding the input color are appropriately warped to give smooth and monotonic output using a concept of color gravity wells toward which other colors are adjusted. However, this technique is specific to neutrals and pure primaries and secondaries.

What is needed in this art is a method for adjusting input colors in the direction of a specified output color to improve image appearance that acts on colors in color space rather than adjusting the colors of certain pixels spatially to robustly render critical colors which are known a priori.

BRIEF SUMMARY

A method is disclosed for squeezing an input hue, $H_{in}$, toward a region of preferred hue, $H_{pref}$, having a preferred chroma, $C_{pref}$, and luminance, $L_{pref}$, to restrict the rotation effect to a point in LCH space rather than an entire hue slice. This method involves defining a chroma weight as: $C_{weight}=\text{Gaussian}(C_{pref}, C_{sigma})$; defining a luminance weight as: $L_{weight}=\text{Gaussian}(L_{pref}, L_{sigma})$; defining a hue weight as: $H_{weight}=\text{Gaussian}(H_{pref}, H_{sigma})$ wherein the Gaussian function can be alternatively replaced by one of either the sum of two Gaussians or a Gaussian convolved with a Rect function; defining an amount of hue adjustment as: $H_{Adjust}=\Delta H^*(H_{weight}^* C_{weight}^* L_{weight})$; and finally, generating an output hue by applying hue adjustment to hue input such that: $H_{out}=H_{in}-H_{Adjust}$.

The present invention offers a plurality of advantages. For example, the input can also be squeezed toward a point in either RGB, a*b*, or u'v' space. Multiple hue centers can be use to sequentially squeeze the input toward a region of a preferred skin, sky, or grass. In the case of multiple squeezes, finite non-overlapping regions of support maintain the shifts from previous squeezes. The inputs can be pre-specified in a color management system or specified and provided dynamically. When squeezing is applied in a non-uniform way, a left side of a weighting curve and a right side of another are used to find regions of rapid decrease in quality for positive $\Delta H^*_{ab}$ renditions of certain tones.

DESCRIPTION OF THE SPECIFICATION

One method is disclosed for determining a hue adjustment to an input hue, $H_{in}$, to squeeze the input hue toward a region of preferred hue, $H_{pref}$. The method involves obtaining a change in hue as: $\Delta H=H_{in}-H_{pref}$ and a hue weight as: $H_{weight}=\text{Gaussian}(H_{pref}, H_{sigma})$. An amount of hue adjustment is calculated by: $H_{Adjust}=\Delta H^* H_{weight}$. Then, an output hue is generated by applying the adjustment such that: $H_{out}=H_{in}-H_{Adjust}$.

Change in hue, $\Delta H$, is the difference between the input hue, $H_{in}$ is the hue of a given pixel in the image (or node in the table) and the preferred hue, $H_{pref}$.

$$\Delta H = H_{in} - H_{pref}$$

$$H_{weight} = \text{Gaussian}(H_{pref}, H_{sigma})$$

$$H_{Adjust} = \Delta H^* H_{weight}$$

$$H_{out} = H_{in} - H_{Adjust}$$

The weight approaches 1 at the peak of the Gaussian. When $H_{in}$ is close to the preferred hue, $H_{pref}$, the $\Delta H$ causes the hue adjustment ($H_{Adjust}$) to be small so the output hue is very similar to the input hue (not rotated completely to the preferred hue). Hues very close to, or very far from, the preferred hue, get the least amount of shift.

Another method is disclosed for squeezing an input hue, $H_{in}$, toward a region of preferred hue, $H_{pref}$, having a preferred chroma, $C_{pref}$, and luminance, $L_{pref}$, to restrict the rotation effect to a point in LCH space rather than an entire hue slice. This method involves first defining a chroma weight as: $C_{weight}=\text{Gaussian}(C_{pref}, C_{sigma})$; then, defining a luminance weight as: $L_{weight}=\text{Gaussian}(L_{pref}, L_{sigma})$; defining a hue weight as: $H_{weight}=\text{Gaussian}(H_{pref}, H_{sigma})$; defining an amount of hue adjustment as: $H_{Adjust}=\Delta H^*(H_{weight}^* C_{weight}^* L_{weight})$. Then, generating an output hue by applying hue adjustment to hue input such that: $H_{out}=H_{in}-H_{Adjust}$.

To restrict the rotation effect to be toward a point in LCH space, rather than toward an entire hue slice:

$$C_{weight} = \text{Gaussian}(C_{pref}, C_{sigma})$$

$$L_{weight} = \text{Gaussian}(L_{pref}, L_{sigma})$$

$$H_{weight} = \text{Gaussian}(H_{pref}, H_{sigma})$$

$$H_{Adjust} = \Delta H^*(H_{weight}^* C_{weight}^* L_{weight})$$

$$H_{out} = H_{input} - H_{Adjust}$$

Alternately, the weighting function was altered to be a Gaussian was convolved with a Rect function, which allows independent control over how much to adjust colors and how far away from $H_{pref}$ to change the colors.

Preferably, the weighting function is replaced by the addition of two Gaussians, which allows additional flexibility over how colors are moved toward the preferred point by allowing additional parameters (K, M) for the adjustment.

$$\text{weight\_tmp} = e^{\frac{-(H\_in - M)^2}{2*H\_sigma^2}} + e^{\frac{-(H\_in + M)^2}{2*H\_sigma^2}}$$

$$H_{weight} = K * \text{weight\_tmp} / \max(\text{weight\_tmp})$$

The constant K in the second equation is adjusted such that no crossovers occur in hue. This parameter is adjusted such that the relationship between $H_{out}$ and $H_{in}$ is monotonically increasing.

Also disclosed is a method for determining an adjustment amount to be made to an input chroma, $C_{in}$, to squeeze the input chroma toward a region of preferred chroma, $C_{pref}$. This method involving first defining a change in chroma as: $\Delta C = C_{in} - C_{pref}$ and defining a chroma weight as: $C_{weight} = \text{Gaussian}(C_{pref}, C_{sigma})$. Then, an amount of chroma adjustment is then: $C_{Adjust} = \Delta C * (H_{weight} * C_{weight} * L_{weight})$ An output chroma is generated by applying chroma adjustment to chroma input:

$$C_{out} = C_{in} - C_{Adjust}.$$

The change in chroma, $\Delta C$, is the difference between the chroma of interest, $C_{in}$ and the preferred chroma, $C_{pref}$.

$$\Delta C = C_{in} - C_{pref}$$

$$C_{weight} = \text{Gaussian}(C_{pref}, C_{sigma})$$

$$L_{weight} = \text{Gaussian}(L_{pref}, L_{sigma})$$

$$H_{weight} = \text{Gaussian}(H_{pref}, H_{sigma})$$

$$C_{Adjust} = \Delta C * (H_{weight} * C_{weight} * L_{weight})$$

$$C_{out} = C_{in} - C_{Adjust}$$

Although the current description is directed toward three one-dimensional Gaussian functions, it is intended to also be directed toward a single three-dimensional Gaussian.

The present method is also extensible to squeezing colors toward a point in RGB space, a*b* (as opposed to h°/C*) space, u'v' space, etc.

Because of the sequential nature of the present method, colors are squeezed toward a point and not shifted directly to that point. Colors near the preferred point don't change much as the hue adjustment approaches 0, and this prevents hues from crossing the preferred point or hue reversals.

The present invention is additionally applicable for multiple hue centers, for example, to squeeze toward preferred skin, sky, and grass. This is done sequentially, but as each subsequent squeeze occurs, the former preferred points also be inadvertently shifted. Therefore, in the case of multiple squeezes, finite non-overlapping regions of support are defined making certain to produce smooth transitions between these regions. The squeezing is alternately applied in a non-uniform way, for example, to account for a rapid decrease in quality for positive $\Delta H^*_{ab}$ (yellow) renditions of skin tones. This only involves using the left side of one weighting curve and the right side of another; this is accomplished using two different values of $H_{sigma}$.

The present method can be applied in a device or in an abstract profile. The preferred colors can be pre-specified in the color management system or dynamically specified by the user.

Further advantages include no need for segmentation or other knowledge of input image; no need to specify original color or color vector; monotonicity (no crossovers), smoothness, and flexibility (e.g., the size of the region of surrounding colors this is affected by the "squeezing" can be varied).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for squeezing hue values ($H_{in}$) of a digital image toward a preferred hue value ($H_{pref}$) for the digital image, comprising:
   (a) receiving a digital image file, the digital image file including a plurality of pixels of color image data, each pixel of the color image data being defined by a hue value, a chroma value, and a lightness value;
   (b) selecting a hue value ($H_{in}$) from the digital image file;
   (c) selecting a preferred hue value ($H_{pref}$);
   (d) calculating a hue change value ($\Delta H = H_{in} - H_{pref}$);
   (e) calculating a chroma weight value ($C_{WEIGHT}$) and a hue weight value ($H_{weight}$);
   (f) calculating a hue adjustment value ($H_{Adjust} = \Delta H * (H_{weight*Cweight})$);
   (g) calculating a destination hue value ($H_{out} = H_{in} - H_{Adjust}$); and
   (h) generating a modified digital image file by replacing the hue value ($H_{in}$) in the digital image file with destination hue value ($H_{out}$).

2. The method, as claimed in claim 1, wherein the chroma weight value ($C_{WEIGHT}$) equals Gaussian($C_{pref}, C_{sigma}$).

3. The method, as claimed in claim 1, wherein the hue weight value ($H_{WEIGHT}$) equals Gaussian($H_{pref}, H_{sigma}$).

4. The method, as claimed in claim 2, wherein the hue weight value ($H_{WEIGHT}$) equals Gaussian($H_{pref}, H_{sigma}$).

5. The method, as claimed in claim 1, wherein the preferred hue value ($H_{pref}$), the chroma weight value ($C_{WEIGHT}$), and the hue weight value ($H_{weight}$) are pre-specified in a color management system.

6. The method, as claimed in claim 1, wherein the preferred hue value ($H_{pref}$), the chroma weight value ($C_{WEIGHT}$), and the hue weight value ($H_{weight}$) are dynamically specified by a user.

7. The method, as claimed in claim 1, wherein a first chroma weight value ($C1_{WEIGHT}$) and a first hue weight value ($H1_{weight}$) are calculated for hue values less than the preferred hue value and a second chroma weight value ($C2_{WEIGHT}$) and a second hue weight value ($H2_{weight}$) are calculated for hue values greater than the preferred hue value.

8. A method for squeezing hue values ($H_{in}$) of a digital image toward a preferred hue value ($H_{pref}$) for the digital image, comprising:
   (a) receiving a digital image file, the digital image file including a plurality of pixels of color image data, each pixel of the color image data being defined by a hue value, a chroma value, and a lightness value;
   (b) selecting a hue value ($H_{in}$) from the digital image file;
   (c) selecting a preferred hue value ($H_{pref}$);

(d) calculating a hue change value ($\Delta H = H_{in} - H_{pref}$);

(e) calculating a lightness weight value ($L_{WEIGHT}$) and a hue weight value ($H_{weight}$);

(f) calculating a hue adjustment value ($H_{Adjust} = \Delta H * (H_{weight} * L_{weight})$);

(g) calculating a destination hue value ($H_{out} = H_{in} - H_{Adjust}$); and (h) generating a modified digital image file by replacing the hue value ($H_{in}$) in the digital image file with destination hue value ($H_{out}$).

9. The method, as claimed in claim 8, wherein the lightness weight value ($L_{WEIGHT}$) equals Gaussian($L_{pref}$, $L_{sigma}$).

10. The method, as claimed in claim 8, wherein the hue weight value ($H_{WEIGHT}$) equals Gaussian($H_{pref}$, $H_{sigma}$).

11. The method, as claimed in claim 9, wherein the hue weight value ($H_{WEIGHT}$) equals Gaussian($H_{pref}$, $H_{sigma}$).

12. The method, as claimed in claim 8, wherein the preferred hue value ($H_{pref}$), the lightness weight value ($L_{WEIGHT}$), and the hue weight ($H_{weight}$) are pre-specified in a color management system.

13. The method, as claimed in claim 8, wherein the preferred hue value ($H_{pref}$), the lightness weight value ($L_{WEIGHT}$), and the hue weight value ($H_{weight}$) are dynamically specified by a user.

14. The method, as claimed in claim 8, wherein a first lightness weight value ($L1_{WEIGHT}$) and a first hue weight value ($H1_{weight}$) are calculated for hue values less than the preferred hue value and a second lightness weight value ($L2_{WEIGHT}$) and a second hue weight value ($H2_{weight}$) are calculated for hue values greater than the preferred hue value.

15. A method for squeezing first colorspace values ($CS1_{in}$) of a digital image toward a first colorspace preferred value ($CS1_{pref}$) for the digital image, comprising:

(a) receiving a digital image file, the digital image file including a plurality of pixels of color image data, each pixel of the color image data being defined by a colorspace, the colorspace having a first colorspace value (CS1), a second colorspace value (CS2), and a third colorspace value (CS3);

(b) selecting a first colorspace value ($CS1_{in}$) from the digital image file;

(c) selecting a first preferred colorspace value ($CS1_{pref}$);

(d) calculating a first colorspace change value ($\Delta CS1 = CS1 - CS1_{pref}$);

(e) calculating a first colorspace weight value ($CS1_{WEIGHT}$) and a second colorspace weight value ($CS2_{weight}$);

(f) calculating a first colorspace adjustment value ($CS1_{Adjust} = \Delta CS1 * (CS1_{weight} * CS2_{weight})$);

(g) calculating a first colorspace destination value ($CS1_{out} = CS1_{in} - CS1_{Adjust}$);

(h) repeating, for each first colorspace value in the digital image file, the selecting of the first colorspace value from the digital image file, the calculating of the first colorspace change value, the calculating of the first colorspace adjustment value, and the calculating of the first colorspace destination value; and (i) generating a modified digital image file by replacing each first colorspace value in the digital image file with the associated calculated first colorspace destination value.

16. The method, as claimed in claim 15, wherein the first colorspace weight value ($CS1_{WEIGHT}$) equals Gaussian ($CS1_{pref}$, $CS1_{sigma}$).

17. The method, as claimed in claim 15, wherein the preferred first colorspace value ($CS1_{pref}$), the first colorspace weight value ($CS1_{WEIGHT}$), and the second colorspace weight value ($CS2_{weight}$) are pre-specified in a color management system.

18. The method, as claimed in claim 15, wherein the preferred first colorspace value ($CS1_{pref}$), the first colorspace weight value ($CS1_{WEIGHT}$), and the second colorspace weight value ($CS2_{weight}$) are dynamically specified by a user.

19. The method, as claimed in claim 15, wherein a first colorspace weight value ($CS1_{WEIGHT}$) and a second colorspace weight value ($CS2_{weight}$) are calculated for first colorspace values less than the preferred first colorspace value and a third colorspace weight value ($CS3_{WEIGHT}$), a fourth colorspace weight value ($CS4_{weight}$) are calculated for first colorspace greater than the preferred first colorspace value.

* * * * *